(12) United States Patent
Luhrs et al.

(10) Patent No.: US 8,709,126 B1
(45) Date of Patent: Apr. 29, 2014

(54) GENERATION OF METAL AND ALLOY MICRON, SUBMICRON, OR NANO PARTICLES IN SIMPLE, RAPID PROCESS

(75) Inventors: Claudia Catalina Luhrs, Rio Rancho, NM (US); Zayd Leseman, Albuquerque, NM (US); Jonathan Phillips, Rio Rancho, NM (US); Hugo Ricardo Zea-Ramirez, Bogota, CO (US)

(73) Assignee: STC.UNM, Albuquerque, NM (US)

( * ) Notice: Subject to any disclaimer, the term of this patent is extended or adjusted under 35 U.S.C. 154(b) by 390 days.

(21) Appl. No.: 13/020,791

(22) Filed: Feb. 3, 2011

Related U.S. Application Data

(60) Provisional application No. 61/337,495, filed on Feb. 3, 2010.

(51) Int. Cl.
*B22F 9/26* (2006.01)
*B82Y 40/00* (2011.01)

(52) U.S. Cl.
CPC .. *B22F 9/26* (2013.01); *B82Y 40/00* (2013.01)
USPC .............................................. 75/351; 75/369

(58) Field of Classification Search
None
See application file for complete search history.

(56) References Cited

U.S. PATENT DOCUMENTS

| | | | | |
|---|---|---|---|---|
| 3,865,573 A | * | 2/1975 | Neumann et al. | 75/314 |
| 3,957,482 A | * | 5/1976 | Whigham | 75/369 |
| 5,652,192 A | * | 7/1997 | Matson et al. | 502/304 |
| 6,706,416 B1 | * | 3/2004 | Cacace | 428/548 |
| 7,524,353 B2 | * | 4/2009 | Johnson et al. | 75/360 |
| 2009/0098033 A1 | * | 4/2009 | Lian et al. | 423/213.5 |

* cited by examiner

*Primary Examiner* — George Wyszomierski
(74) *Attorney, Agent, or Firm* — MH2 Technology Law Group, LLP

(57) ABSTRACT

Various embodiments provide methods of forming metallic particles or carbon/graphite coated metallic particles with zero-valence from metal precursor compounds by a reductive/expansion synthesis method using nitrogen-hydrogen containing molecules.

20 Claims, 3 Drawing Sheets

GENERATION OF METAL AND ALLOY MICRON, SUBMICRON, OR NANO PARTICLES IN SIMPLE, RAPID PROCESS

RELATED APPLICATIONS

This application claims priority to U.S. Provisional Patent Application Ser. No. 61/337,495, filed Feb. 3, 2010, which is hereby incorporated by reference in its entirety.

BACKGROUND

Many uses have been proposed for nanoparticles including armor, surface coating, data storage, inks, bio-imaging applications, and sinter resistant catalysts. The recent demonstration of complex nanoparticles, that is nanoparticles with multiple shells, and/or designed void spaces, suggests other applications such as anode or cathode materials for high energy density batteries, and light, high energy density solid fuels. Enabling these technologies will require means to make large quantities of nanoparticles.

There are many processes for making primarily metallic nanoparticles including several aerosol techniques such as aerosol-through-plasma (A-T-P) including evaporation of solvents from small drops containing dissolved salts and flame synthesis. Non-aerosol processes for making nano-sized metal particles include metal gas evaporation, metal evaporation in a flowing gas stream, mechanical attrition, sputtering, electron beam evaporation, electron beam induced atomization of binary metal azides, expansion of metal vapor in a supersonic free jet, inverse micelle techniques, laser ablation, laser-induced breakdown of organometallic compounds, and pyrolysis of organometallic compounds between others. It is, however, still desirable to provide methods for generating metal particles using a simple and rapid process.

Additionally, particles sized in the micron to sub-micron range are needed to enable a host of existing technologies. Currently, there are no practical methods for economically making micron and sub-micron sized metal particles.

For example, particle injection molding (PIM) process is less expensive than other conventional process (e.g., machining) and currently employed to create metal parts of ca. 100 microns or less. PIM is a process involving creating objects by injecting metal/wax composites into molds, followed by removing the wax. Parts of nearly every electronic device are made using PIM processes including computers, cell phones, cameras, and watches. The average automobile produced today has nearly 50 lbs of injection molded parts. Also, high tech mini-drills, some dental implants, etc. use parts made by PIM.

A critical rule of PIM generated parts is that the particles used should have a size about 5% of the minimum part dimension. At present, there is no efficient process for creating metal particles with a median size, e.g., of less than about 5 microns. The standard commercial methods including high pressure atomization or water atomization have reached asymptotic limit and do not result in smaller size. This absence of a suitable technology means that PIM is economic only for objects greater than 10 microns in dimension. Even with more energy, higher pressure, etc, metal particles are not generated in the micron/sub-micron size.

It is also notable that there are applications for carbon and graphite coated metal particles. For example, graphite coated particles may be used in next-generation lithium compound batteries. In another example, carbon or graphite coating may eliminate or reduce sinter rate of metal particles employed in high temperature (ca. >250° C.) applications, such as high temperature catalysis.

Hence, it is desirable to provide a method or process capable of producing metal particles and alloys in the micron or sub-micron size range. It is also desirable to provide a method or process capable of producing metal particles and alloys that are carbon or graphite coated in the nano, sub-micron, or micron size range. It is further desirable to provide a simple and rapid process.

SUMMARY

According to various embodiments, the present teachings include a method of forming a metallic particle. In this method, one or more metal precursor compounds can be physically mixed with a chemical agent to form a physical mixture. The physical mixture can then be heated in an inert atmosphere to decompose the chemical agent to form a plurality of metallic particles. Each metallic particle can include one or more metals corresponding to the one or more metal precursor compounds.

According to various embodiments, the present teachings also include method of forming a metallic particle. The metallic particle can be formed by physically mixing a metal precursor compound with a nitrogen-hydrogen (N—H) containing molecule to form a physical mixture. The physical mixture can then be heated in an inert atmosphere to a heating temperature to form a plurality of metallic particles each include a metal with zero valence. The metal can correspond to the metal precursor compound and the heating temperature can be in the range between a decomposition temperature of the N—H containing molecule and a melting temperature of the metal.

According to various embodiments, the present teachings further include a method of forming a metal alloy particle. To form the metal alloy particle, a physical mixture can be formed by physically mixing a plurality of metal precursor compounds with a nitrogen-hydrogen (N—H) containing molecule. The physical mixture can then be heated in an inert atmosphere to a heating temperature to form a plurality of metal alloy particles each with zero-valence and including two or more distinct metals corresponding to the plurality of metal precursor compounds. The heating temperature can be in the range between a decomposition temperature of the N—H containing molecule and a melting temperature of each of the two or more distinct metals.

According to various embodiments, the present teachings further include a method of forming a metal or metal alloy particle covered by a carbonaceous shell. To form the metal or metal alloy particle with the carbonaceous shell, a physical mixture can be formed by physically mixing one or more metal precursor compounds with a chemical agent such as a nitrogen-hydrogen (N—H) containing molecule. The physical mixture can then be heated in an inert atmosphere to a heating temperature to form a plurality of metal particles each with zero-valence and each including a metal or a metal alloy. The heating temperature can be in the range between a decomposition temperature of the N—H containing molecule and a melting temperature of each metal corresponding to the one or more metal precursor compounds. A carbonaceous shell can be formed surrounding a corresponding metallic particle and formed at least based on a selection the one or more metal precursor compounds.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the invention.

DESCRIPTION OF THE EMBODIMENTS

Figure 1:
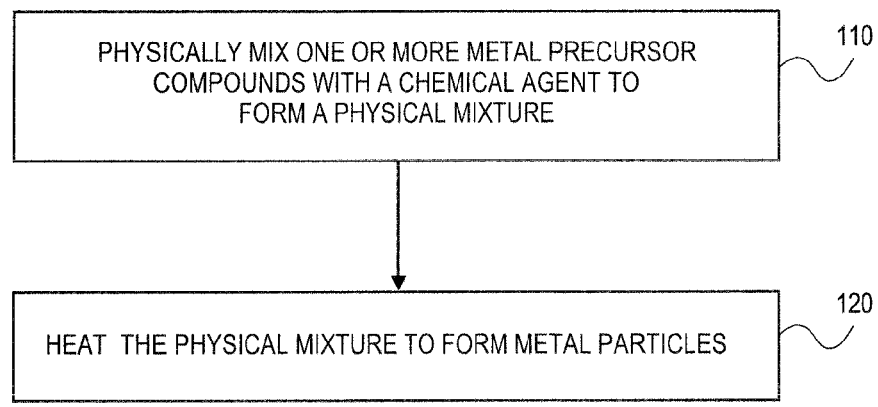
FIG. 1 depicts an exemplary method of forming metallic particles including metal alloy particles in accordance with various embodiments of the present teachings.

Reference will now be made in detail to exemplary embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Various embodiments provide materials and methods for forming metallic particles. As used herein, the term "metallic particles" refers to particles formed of one or more metals. In some cases, the metallic particles can be formed of one metal. In other cases, the metallic particles can be formed of two or more distinct metals, which are also referred to as metal alloy particles. The metallic particles can have zero-valence and be formed on nano-, sub-micron- and/or micron-scale in particle size. For example, the metallic particles can have an average particle size ranging from about 1 nanometer to about 1000 micrometers, such as ranging from about 5 nanometers to about 5 micrometers.

During formation, one or more metal precursor compounds, e.g. metal nitrates, can be physically combined with a chemical agent, e.g., a nitrogen-hydrogen (N—H) containing molecule such as urea that releases gaseous reducing species upon reaching its decomposition temperature. The physical mixture can then be heated at least to the decomposition temperature of the chemical agent to form the disclosed metallic particles, which include metal alloy particles. Specifically, the metal precursor compounds can be decomposed to create metallic (i.e., zero valent) particles. The disclosed formation method is also referred to herein as "reductive/expansion synthesis (RES)."

In embodiments, the metal precursor behavior can be a function of the selected precursor. For example, if the metal precursor compound is a nitrate species, it can decompose at roughly the same temperature range as for the chemical agent species, e.g., urea. If the metal precursor is an oxide (e.g. NiO), it will generally not decompose, but simply be reduced by gases released during the decomposition of the chemical agent species.

Control studies show that the following three conditions must be present for RES to create the disclosed metallic particles with zero-valence. Firstly, metal precursor compounds can contain non-zero (e.g., positive) valent metal(s). Secondly, the metal precursor compounds can be physically mixed (e.g. by mechanical grinding) with a chemical agent that decomposes to yield reducing gases (e.g., urea). Thirdly, a chemically inert atmosphere can be provided for the heating process to form the disclosed metallic particles.

In this manner, metallic particles containing one or more zero valent metals can be formed, as opposed to forming metal oxide by the conventional combustion synthesis. Specifically, in a conventional combustion synthesis, similar metal precursors to those employed herein are often used (e.g. metal nitrates). However, neither an inert atmosphere (specifically no oxygen), nor a chemical agent species (e.g., urea) that decomposes to yield reducing gases upon heating, is employed. Hence, the conventional combustion synthesis process never produces zero valent metallic particles.

FIG. 1 depicts an exemplary method 100 of forming metallic particles in accordance with various embodiments of the present teachings. At 110, one or more metal precursor compounds and one or more chemical agents can be physically mixed, for example, by mechanical grinding.

The metal precursor compounds can be any metal compounds containing one or more non-zero (e.g., positive) valent metals. The metal precursor compounds can include, but are not limited to, nitrates, hydrated nitrates, oxides, nitrates, oxide-nitrides, halogens such as chlorides, bromides, iodides, or fluorides, hydroxides, and/or other compounds of one or more metals. Among these, exemplary metal precursor compounds can include, but are not limited to, $Fe(NO_3)_3 9H_2O$, $Ni(NO_3)_2 6H_2O$, $Co(NO_3)_2 6H_2O$, $In(NO_3)_3 H_2O$, $Ga(NO_3)_3 6H_2O$, etc., providing the source of metal(s) for forming the metallic particles. The bonds in the metal precursor compounds can be ionic, covalent, or partially ionic in character.

In embodiments, the one or more metals corresponding to the metal precursor compounds can include virtually any metal, such as, for example, transitions metal in columns IB, IIB, VB, VIB, and/or VIIB in the periodic table, alkali metals in column IA, and alkali earth element in column HA in the periodic table, but not limited to those. In certain embodiments, metallic particles that include Al and Sn can be made from species in columns IIIA and IVA in the periodic table.

Depending on the particles to be formed, the physical mixture can include a plurality of metal precursor compounds having different metals, to form a plurality of metallic particles of metal alloy, wherein each metal alloy particle can include two or more distinct metals having a metal ratio that substantially matches the metal ratio between the plurality of metal precursor compounds.

The chemical agents can include, but are not limited to, nitrogen-hydrogen (N—H) containing molecules such as urea $[(NH_2)_2CO]$, ammonia $(NH_3)$, a compound containing —$NH_2$ or —NH, etc. For example, urea can be decomposed to generate species including CO, $H_x$, and $NH_x$ groups, which are active and ready for reduction reactions. The chemical agents can also include those present in nature to generate reducing species upon decomposition.

Although various metal precursor compounds and/or chemical agents can be used to form the disclosed metallic particles, for illustrative purposes, the present disclosure primarily discusses use of metal nitrates or hydrated nitrates as exemplary metal precursor compounds and urea as an exemplary chemical agent. In embodiments, the physical mixture can include a molar ratio of metal atoms (e.g., Fe and/or Ni from their hydrated nitrates) to urea molecules ranging from about one to about 30.

Prior to the subsequent heating process, the physical mixture can be processed, e.g., to form a homogenous mixture, to remove air pockets therefrom, and/or to be continuously treated in an inert atmosphere. In exemplary embodiments, the physical mixture can be placed, e.g., in quartz tube used as a reaction chamber, with one or more inert gases passing through the reaction chamber. The inert gases can be chemically inert and do not react with any components, e.g., metals, in the reaction chamber. The inert gases can include nitrogen, argon, helium, etc.

At 120, the physical mixture maintained in the inert atmosphere can be heated. For example, the reaction chamber containing the physical mixture can be placed in a pre-heated oven/furnace having a heating temperature. The heating temperature can be in a range between the decomposition temperature of the chemical agent such as urea and the melting temperature of the target metal, i.e., the metals formed from the metal precursor compounds. For example, the pre-heated oven can have a temperature ranging from 300° C. to 900° C., or about 400° C. to about 1000° C., such as about 800° C., while the physical mixture placed therein can be heated from ambient temperature for a time period of about a few seconds to few minutes, for example, about 5 minutes or less. The heating temperature and the time length are not limited according to various embodiments. In embodiments, the heating temperature and the time length can be chosen to insure the full decomposition of the chemical agent (e.g., urea) and, in some case the metal precursor as well (e.g. nitrates) and thus insure the formation of the metallic (zero valent) particles.

In other embodiments, the physical mixture can be heated in an oven/furnace from the ambient temperature to the determined temperature at a heating rate ranging from about 1° C./minute to about 500° C./minute. Following the heating process, the heated mixture sample can be cooled to the ambient temperature. Following the cooling process, resulting particle products can be recovered.

In embodiments, the metal precursor identity, the ratio of metal atoms from precursor compounds to the chemical agent in the physical mixture, the mixing procedure, the heating rate, the maximum heating temperature, the flow rate of the inert gas, identity of the inert gas, and/or other parameters can be used to control particle sizes and size distribution of the resulting metallic particles.

In embodiments, the resulting metallic particles can contain one or more exemplary metals including, but not limited to, Fe, Ni, Sb, Co, Mg, Mn, Cr, Cu, Zn, or W. The resulting metallic particles can have an average particle size ranging from about 1 nm to about 1000 μm, such as, less than about 5 μm or less than about 250 nm. In exemplary embodiments, the resulting particles can have a particle size distribution ranging from about 40 nm to about 3 microns with an average particle size of about 250 nm.

In some embodiments, the process factors or parameters, for example, the molecular identity of the metal-containing precursor compound(s), the chemical agent that produces reducing gases upon thermal decomposition or other operating parameters including ratio of chemical agent to metal containing precursor, heating rate, maximum temperature, inert gas flow rate, etc. can be selected such that the metallic particles can be formed to have a carbonaceous shell of carbon or graphite. The carbonaceous shell of carbon or graphite can be a non-conformal coating, such that each particle can contain a carbon shell surrounding metallic particles and a plurality of void spaces within the metallic particles.

In embodiments, a portion of the formed metallic particles can be weakly agglomerated. The agglomerated particles can be on micro-scale in particle size, for example, less than about 5 μm or less than about 1 μm. The agglomerated metallic particles can have a high aspect ratio of about 1 or greater, such as ranging from about 1 to about 10, although not limited. The formed metallic particles can thus include non-agglomerated metallic particles and agglomerated metallic particles, wherein the agglomerated metallic particles can be present in an amount of about 1% to about 100% of the total metallic particles. In some cases, the agglomerates can include carbon or graphite coated metallic particles, wherein carbon or graphite can be a non-conformal coating, such that each metallic particle can contain a carbon shell surrounding metallic particles and a plurality of void spaces within the metallic particles.

The term "weakly agglomerated" refers to a comparison of the metallic particles formed by the disclosed RES process in the presence of the chemical agent with metal oxide aggregate particles of the same metal and the same approximate size created using the conventional combustion synthesis. In experiments, the agglomerated metallic particles made using RES can be easily spread (like mayonnaise) with a light touch using a small spatula, for example. In comparison, strongly aggregated metal oxide particles produced by conventional routes are difficult or impossible to spread.

In embodiments, via increased urea/metal precursor ratios, the exemplary metallic particles can be formed to include carbon in a form as a thin graphite layer, e.g., coated on the metallic particles formed of Ni and Fe—Ni, or as carbide of the metallic particles of Fe, for example. The thin graphite layer can have a thickness of about 10 nm or less, or about 2 nm or less. In embodiments, the thin graphite layer can be used to form hollow graphitic shells. In an embodiment, graphite coated metals can be used for batteries and other devices.

As disclosed herein, the method depicted in FIG. 1 can provide many advantages. For example, micron, sub-micron- and/or nano-metallic particles can be produced rapidly with standard moderate temperature (e.g., about 600° C.) heating furnaces, at atmospheric pressure. Further, it appears that the process can be readily scaled to large volumes. Additionally, the composition of metallic particles, the size of the particles, the width of the particle size distribution, and/or the degree of graphite coverage can be controlled by selection of the correct precursor (e.g., metal oxides tend not to form carbon coats), and/or controlling the ratio of metal precursor compound to the reducing reagent, the rate of inert gas flow rate (generally lower flow rates improve the yield of metallic phase product), and/or the rate of heating.

EXAMPLES

Table 1 lists various exemplary sample compositions of the physical mixtures including one or more metal nitrates for forming metallic particles including metal alloy particles. Table 1 also lists metal-metal ratios and metal(s)-urea ratios,

TABLE 1

| Sample | | Fe/Ni atomic ratio | Fe-Ni precursor/urea weight ratio |
|---|---|---|---|
| 1 | Ni | 0/1 | 1/4.5 |
| 2 | Fe | 1/0 | 1/4.5 |

TABLE 1-continued

| Sample | | Fe/Ni atomic ratio | Fe-Ni precursor/urea weight ratio |
|---|---|---|---|
| 3 | Fe-Ni | 1/1 | 1/4.5 |
| 4 | Fe-Ni | 1/1 | 1/0 |

The particular mixtures employed in Table 1 contained urea (Aldrich 99.9%), $Fe(NO_3)_3$ $9H_2O$ (Aldrich 99.9%) and/or $Ni(NO_3)_2$ $6H_2O$ (Aldrich, 99.99%). To make Fe—Ni alloy nanoparticles with 1:1 atomic stoichiometry, about 0.25 g of $Fe(NO_3)_3$ $9H_2O$, about 0.1825 g of $Ni(NO_3)_2$ $6H_2O$, and about 2 g of urea (see Sample 3 in Table 1) were added to an alumina mortar and ground until a homogenous, green paste was formed. The mixture paste was transferred to a precursor holder, such as an alumina boat having a dimension of about 4 cm×1 cm×1 cm, and 'kneaded' gently with a small spatula, e.g., having about 0.5 cm blade, to remove any gross scale air pockets. The boat was then maneuvered to the center of a quartz tube, through which nitrogen gas, e.g., of about 99.999%, passes. The exemplary quartz tube had a diameter of about 2.5 cm and a length of about 30 cm. Next, the quartz tube (still at ambient temperature) containing the mixture paste was flushed with nitrogen gas at about 400 ml/min for at least 20 minutes to remove air in the quartz tube. In the final step, the quartz tube was quickly placed in a clamshell furnace with a heated section of about 20 cm length that was pre-heated at about 800° C. That is, the pre-heated clamshell furnace was quickly opened and the pre-loaded quartz tube was placed inside (inert gas still flowing) and then the clamshell furnace was closed. The entire placement process took less than about 20 seconds. Almost about 3 minutes after the completion of the placement process, the clamshell furnace was re-opened, and the quartz tube (inert gas still flowing) containing metallic particle 'product' was quickly removed to a cradle sitting in the ambient (ca. 20° C.) environment.

Figure 2:
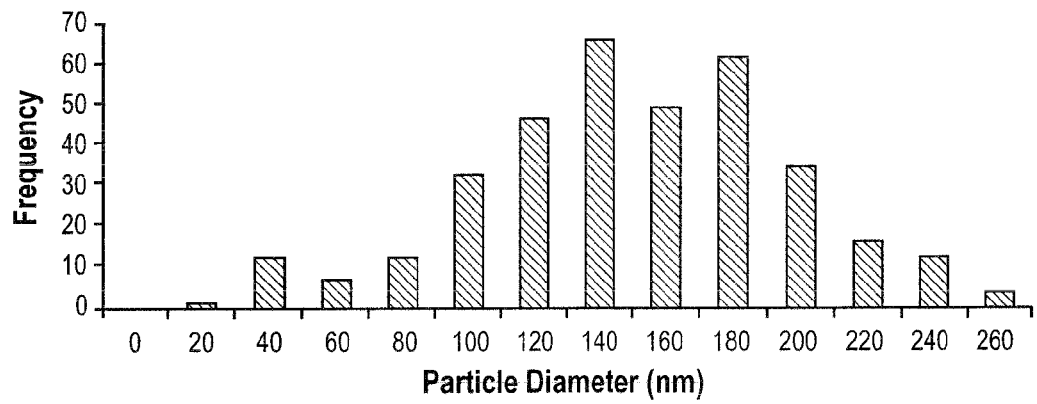
FIG. 2 depicts an exemplary particle size distribution of exemplary metallic particles in accordance with various embodiments of the present teachings.

Exemplary FeNi metal alloy particles were prepared from the physical mixture having a composition according to Sample 1 in Table 1. As observed from SEM (i.e., scanning electron microscope) and TEM (i.e., transmission electron microscope) images (not illustrated), the formed metal alloy particles had a substantially spherical shape and some of them were weekly bound to form micro-scale agglomerated particles. The formed metal alloy particles were small particles having a particle size between 50 and 150 nm. FIG. 2 depicts an exemplary particle size distribution based on the SEM results of the exemplary Fe—Ni metal alloy particles. As shown, particle sizes distributed from about 40 nm to about 250 nm with an average particle size of about 100-150 nm.

The particle sizes were further confirmed by the TEM images. TEM results showed the agglomerated particles had high aspect ratio formed by metallic particles of about 150 nm or less in dimension. TEM analysis also revealed that a thin shell, less than about 10 nm, of graphitic carbon was found on the metallic particles.

Figure 3A:
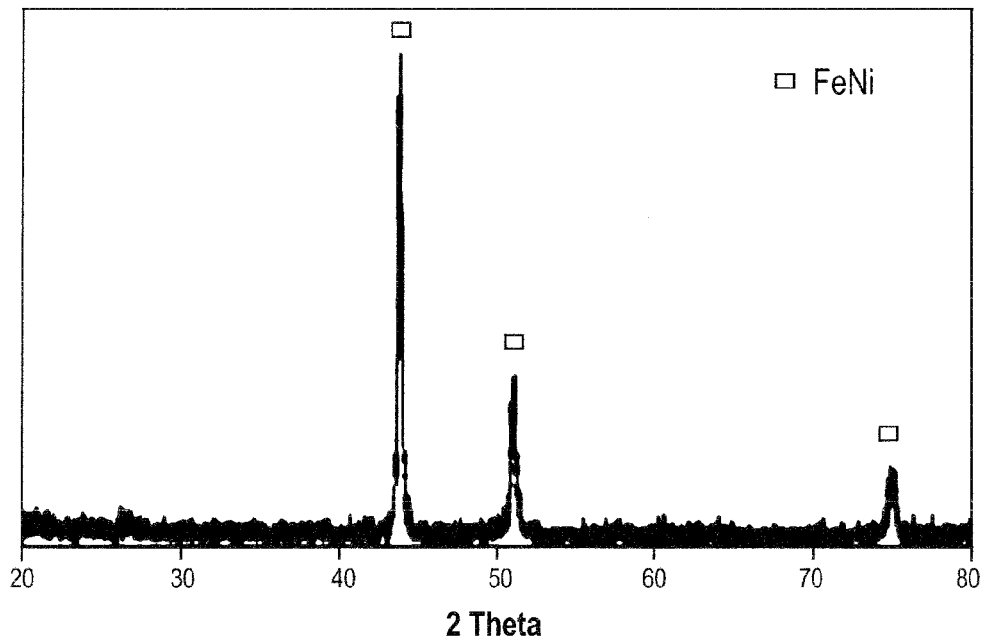
FIGS. 3A-3C depict X-ray diffractometer (XRD) results of exemplary metallic particles in accordance with various embodiments of the present teachings.
Figure 3B:
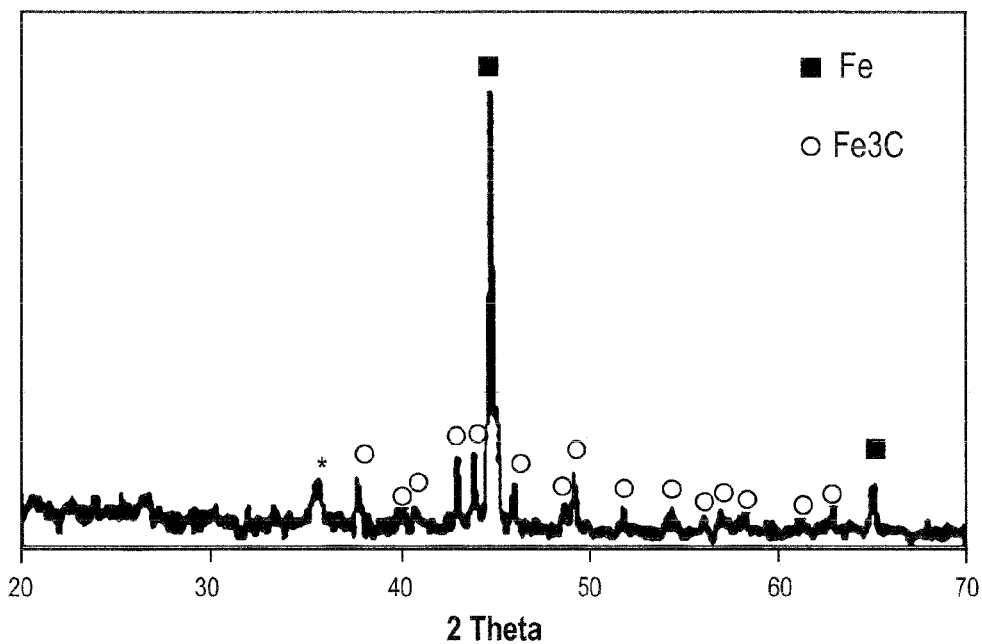
Figure 3C:
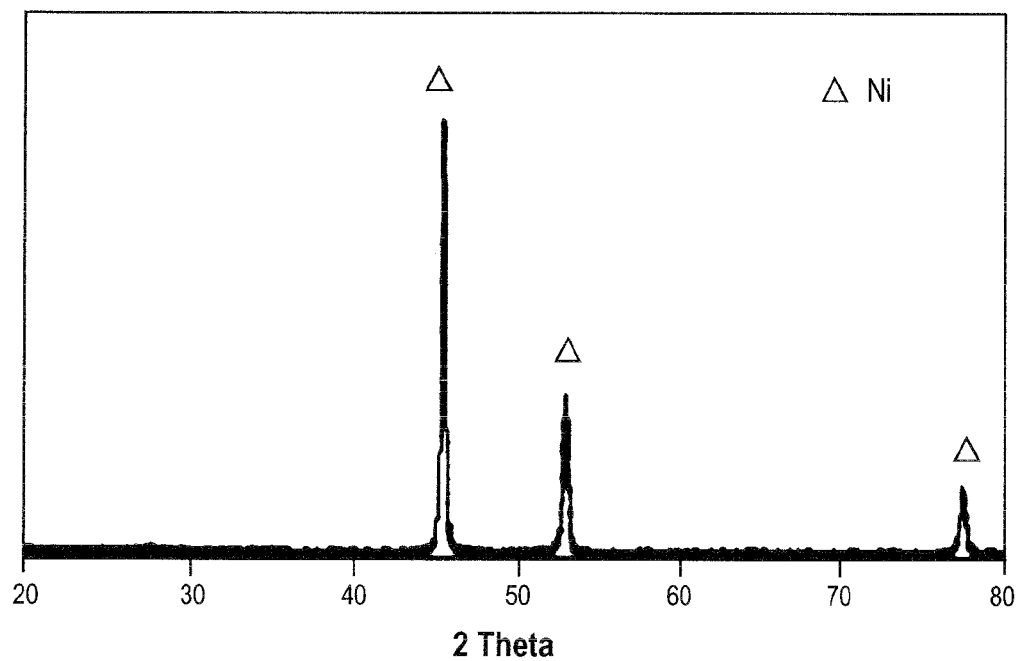

FIGS. 3A-3C depict XRD (i.e., X-ray diffractomer) results of the formed metallic particles. In FIG. 3A, the XRD shows that the metal phase present is FeNi alloy with a evidence of graphite at about 26° (2θ). Note that, the peaks were in the intensity ratio reported for randomly oriented samples. EDS (i.e., energy dispersive spectroscopy) analysis confirmed that metallic FeNi alloys with a graphitic coating was formed. In addition, a control experiment was conducted with pure argon, in place of the reducing gas. Because there was no chemical agent in the reaction system, a small oxide peak (8% the intensity of Fe+Ni peaks) was found.

Exemplary Fe metallic particles were prepared from the physical mixture having a composition according to Sample 2 in Table 1, i.e., including iron nitrate and urea. In FIG. 3B, XRD data shows that both metallic iron and iron carbide ($Fe_3C$) are present. Both the XRD data and EDS analysis showed fiber like particles suggesting that some of the particles are iron carbide. The particles are similar in size to the particles containing FeNi and the particles containing Ni only.

SEM and TEM data for the formed Fe particles shows that micro-scale particles are agglomerates of nanoscale Fe particles. Higher magnification SEM image indicate that the Fe particles are no more than about 150 nm in maximum dimension. However, fiber-like particles were observed due to weak aggregation of Fe particles. The aggregated fibers were found in roughly 50% of the formed sample. EDS analysis also suggests the fibers are iron carbide.

In FIG. 3C, XRD analysis examined particles formed from nickel nitrate with urea. Metallic nickel (no carbide involved) was observed produced from a mixture of urea and nickel nitrate. A control experiment using an identical protocol to the sample of FIG. 3C was also performed for comparison purpose, i.e., in the absence of urea but with nickel nitrate. As a result, only NiO was observed with possible graphite seen at about 26° (2θ) from this control experiment. In both cases, particles on the order of about 100 nm in size were formed and agglomerated, while the formed Ni metallic particles were more weakly agglomerated (easily spread with a small spatula), as compared with the aggregated (that is virtually impossible to 'spread') NiO particles from the control experiment. In particular, the metallic particles 'spread' on standard notebook paper to form an apparently homogenous 'smear', whereas the aggregated oxide particles formed a discontinuous, lumpy, appearance when spread with the spatula.

In embodiments, selection of metal precursor compounds can play a role in the resulting products. For example, NiO can be used as metal precursor and can replace the exemplary Ni-Nitride as discussed above in FIG. 3C with other process conditions unchanged, e.g., having the same flow rates, the same temperatures, the same number of moles of Ni, the same ratio of Ni atoms to urea molecules, etc. SEM, XRD, and TEM studies showed that in this particular example, only pure, zero valent, metallic Ni particles were produced. No carbon was observed.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method of forming a metallic particle comprising:
    mixing one or more metal precursor compounds and a chemical agent that produces reducing gases upon thermal decomposition to form a physical mixture, wherein the one or more metal precursor compounds comprise one or more metals having a positive valence; and
    heating the physical mixture in an inert atmosphere to a temperature ranging from 300° C. to 900° C., to form a plurality of metallic particles each comprising one or more metals corresponding to the one or more metal precursor compounds,
    wherein the chemical reducing agent is urea and the one or more metal precursor compounds comprise nitrates or hydrated nitrates of a metal selected from Fe, Ni and a combination thereof.

2. The method of claim 1, further comprising determining a heating temperature for heating the physical mixture, wherein the heating temperature ranges between a decomposition temperature of the chemical agent and 900° C.

3. The method of claim 1, wherein the step of heating the physical mixture comprises placing the physical mixture in an oven pre-heated at a heating temperature for about 5 minutes or less.

4. The method of claim 1, further comprising heating the physical mixture at a heating rate ranging from about 1° C./min to about 500° C./min.

5. The method of claim 1, wherein the physical mixture comprises a ratio such that there are one or more nitrogen groups from the chemical agent for each metal atom from the one or more metal precursor compounds.

6. The method of claim 1, wherein the heating of the physical mixture occurs for a length of time of 5 minutes or less.

7. The method of claim 1, further comprising:
    placing the physical mixture under the inert atmosphere, prior to the step of heating the physical mixture, and
    cooling the plurality of metallic particles to the ambient temperature under the inert atmosphere, following the step of heating the physical mixture.

8. The method of claim 1, wherein each of the plurality of metallic particles is zero valent and has a particle size of about 250 nm or less.

9. The method of claim 1, wherein a portion of the plurality of metallic particles forms an agglomerated particle in the step of heating the physical mixture, wherein the agglomerated particle has an average particle size of about 2 µm or less, or an aspect ratio ranging from about 10 to about 1.

10. The method of claim 1, further comprising controlling an average size of the plurality of metallic particles in a range between about 1 nm to about 1000 µm by controlling one or more parameters selected from a metal precursor identity, a ratio of metal atoms in the one or more metal precursor compounds to the chemical agent, a flow rate of an inert gas, an identity of the inert gas, a heating rate, and a maximum heating temperature.

11. A method of forming a metallic particle comprising:
    mixing one or more metal precursor compounds and a chemical agent that produces reducing gases upon thermal decomposition to form a physical mixture, wherein the one or more metal precursor compounds comprise one or more metals having a positive valence; and
    heating the physical mixture in an inert atmosphere to form a plurality of metallic particles each comprising one or more metals corresponding to the one or more metal precursor compounds, wherein each metallic particle of the plurality of metallic particles comprises a carbonaceous shell comprising carbon or graphite surrounding the metallic particle,
    wherein the chemical agent that produces reducing gases upon thermal decomposition comprises one or more nitrogen-hydrogen-containing molecules.

12. The method of claim 11, wherein the carbonaceous shell is formed by controlling at least one of an identity of the one or more metal precursor compounds, an identity of the chemical agent, a ratio of the chemical agent to the one or more metal precursor compounds, a heating rate, a maximum heating temperature, or an inert gas flow rate.

13. The method of claim 11, wherein the carbonaceous shell is a non-conformal coating and surrounds both the metallic particle and a plurality of void spaces.

14. The method of claim 11, wherein the chemical agent comprises one or more carbon-containing molecules.

15. The method of claim 11, wherein the one or more nitrogen-hydrogen-containing molecules are selected from the group consisting of urea [$(NH_2)_2CO$] and a compound containing —NH or —$NH_2$.

16. The method of claim 15, wherein the one or more metal precursor compounds comprise nitrates, hydrated nitrates, nitrides, oxides, oxide-nitrides, halogens, or hydroxides of one or more metals, and wherein each of the one or more metals are chosen from a metal in one or more of columns IB, IIB, VB, VIIB, VIIB, VIIB, IA, IIA, IIIA, or IVA of the periodic table.

17. The method of claim 16, wherein the chemical reducing agent is urea.

18. The method of claim 17, wherein and the one or more metal precursor compounds comprise nitrates or hydrated nitrates of a metal selected from Fe, Ni and a combination thereof.

19. The method of claim 17, wherein the metallic particle comprises one or more metals selected from the group consisting of Fe, Ni, Sb, Co, Mg, Mn, Cr, Zn, Cu and W.

20. A method of forming a metallic particle comprising:
    mixing one or more metal precursor compounds and a chemical agent that produces reducing gases upon thermal decomposition to form a physical mixture, wherein the one or more metal precursor compounds comprise one or more metals having a positive valence; and
    heating the physical mixture in an inert atmosphere to a temperature ranging from about 400° C. to about 1000° C., to form a plurality of metallic particles each comprising one or more metals corresponding to the one or more metal precursor compounds, wherein the chemical reducing agent is urea and the one or more metal precursor compounds comprise nitrates or hydrated nitrates of a metal selected from Fe, Ni and a combination thereof.

* * * * *

UNITED STATES PATENT AND TRADEMARK OFFICE
CERTIFICATE OF CORRECTION

PATENT NO. : 8,709,126 B1  
APPLICATION NO. : 13/020791  
DATED : April 29, 2014  
INVENTOR(S) : Claudia Luhrs et al.

Page 1 of 1

It is certified that error appears in the above-identified patent and that said Letters Patent is hereby corrected as shown below:

In the Specification

Column 1, after the first paragraph, lines 10-12, insert the following paragraph:

--Government Rights

This invention was made with Government support under Grant No. DE-AC52-06NA25396 DOE/NNSA awarded by Los Alamos National Laboratory. The U.S. Government has certain rights in the invention.--

Signed and Sealed this
Eighteenth Day of November, 2014

Michelle K. Lee
*Deputy Director of the United States Patent and Trademark Office*